United States Patent [19]
Adl et al.
[11] Patent Number: 4,507,008
[45] Date of Patent: Mar. 26, 1985

[54] STRANDED CABLE TERMINATION ARRANGEMENT

[75] Inventors: Ali Adl, Freehold Township, Monmouth County; William D. Backus, Bricktown, both of N.J.

[73] Assignee: AT&T Bell Laboratories, Murray Hill, N.J.

[21] Appl. No.: 495,066

[22] Filed: May 13, 1983

[51] Int. Cl.³ .............................................. F16G 11/05

[52] U.S. Cl. .................................... 403/275; 403/277; 403/280; 403/281; 24/122.6; 29/523; 29/461; 339/273 R; 174/89

[58] Field of Search ................... 294/102 R; 24/122.6, 24/122.3, 115 M, 136 L, 263 SW; 188/67; 174/89, 79; 403/275, 277, 248, 280, 281, 365, 268, 267; 29/523, 522 R, 461; 339/273 R

[56] References Cited

U.S. PATENT DOCUMENTS

| | | | |
|---|---|---|---|
| 3,229,341 | 1/1966 | Maras | 403/275 |
| 3,416,197 | 12/1968 | Mark | 29/518 |
| 3,454,707 | 7/1969 | Langmack | 174/70 |
| 3,600,765 | 8/1971 | Rovinsky | 24/122.6 |
| 3,698,749 | 10/1972 | Yonkers | 403/368 X |
| 4,020,546 | 5/1977 | May | 29/873 |
| 4,123,133 | 4/1978 | Pickett et al. | 339/273 R |

FOREIGN PATENT DOCUMENTS

| | | | |
|---|---|---|---|
| 2410186 | 7/1979 | France | 24/122.6 |

OTHER PUBLICATIONS

G. E. Morse et al, "Cable and Coupling Design", *Bell System Technical Journal*, vol. 57, No. 7, Sep. 1978, pp. 2435–2469.

*Primary Examiner*—Richard J. Scanlan, Jr.
*Attorney, Agent, or Firm*—Richard B. Havill

[57] ABSTRACT

A cable termination arrangement includes a tapered socket body and a mating plug covered with a sleeve of malleable material. Cable strands are inserted and spread out inside of the socket. The plug and sleeve are pushed into the socket for forcing the strands into the sleeve. When a tensile force is applied to the cable, slippage between the cable and the socket is zero.

5 Claims, 6 Drawing Figures

STRANDED CABLE TERMINATION ARRANGEMENT

BACKGROUND OF THE INVENTION

This invention relates to a stranded cable termination arrangement which may be more particularly described as a cable termination for high strength applications.

In the prior art, stranded cables with high tensile strength have been terminated in assemblies which use a clamp or a high strength epoxy to hold the cable end in the termination. Although these prior terminations have been used in various applications for years, there are associated problems.

Problems with the clamp arrangement include slippage between the cable end and the termination hardware when high tensile forces are applied.

Problems with the epoxy arrangement include the just mentioned slippage and a necessity to provide a path through the termination structure for injecting the epoxy, for bleeding out any trapped air and for curing the epoxy to gain maximum strength.

SUMMARY OF THE INVENTION

These problems are solved by a cable termination arrangement including a tapered socket body and a mating plug covered with a sleeve of malleable material. Cable strands are inserted into and are spread out inside of the socket. The plug and sleeve are pushed into the socket, thereby forcing the sleeve around the strands. When a tensile force is applied to the cable, slippage between the cable and the socket body is zero.

BRIEF DESCRIPTION OF THE DRAWING

A better understanding of the invention may be acquired by reading the detailed description following with reference to the appended drawing wherein.

DETAILED DESCRIPTION

Figure 1:
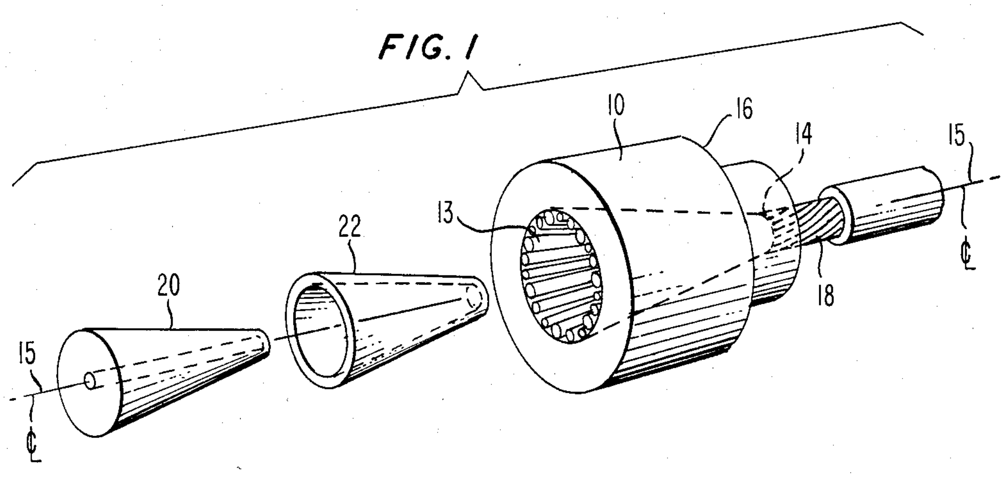
FIG. 1 is an exploded isometric view of a stranded cable termination arrangement in accordance with the invention.

Referring now to FIG. 1, a socket body 10 for a high strength cable termination is fabricated out of a high strength material such as beryllium copper or steel. Other high strength materials may be suitable for some high strength cable terminations. Other lower strength materials may be useful in low strength cable terminations.

In FIG. 1, the socket body 10 has a frustum shaped hollow cavity 12 opening out to a relatively wide base 13 of the frustum. The cavity is shaped like a truncated cone, which is cut off at the top to provide a narrow top opening 14. The sides of the cone intersect at an angle $\alpha$ with a center axis 15 which intersects the planes of the base and the openings at their center points.

The outside of the socket body 10 is shown as a cylindrical shape having a flange, or collar, area 16. This flange area 16 is designed to provide a surface for supporting an insertion force greater than the maximum tensile force $F_M$ which can be applied to the cable being terminated.

A stranded cable 18 is shown with an end inserted through the top opening 14 of the socket body. The several strands of the cable are flared out inside of the socket body and are spread out so that the strands are laid side-by-side near the top opening and slightly separated at the base opening 13 of the socket. These strands are laid down on the surface of the socket without crossovers and in a single layer at the base opening. The cable 18 is designed to withstand the maximum tensile load $F_M$ without failure.

Once the cable strands are flared out inside of the socket body 10, a plug 20 covered with a sleeve 22, is inserted over the strands inside of the socket body.

The plug 20 and the sleeve 22 are shown as conically shaped frustums designed to fit snugly into the socket. Their sides intersect the center axis at the angle $\alpha$.

A high strength material such as steel or beryllium copper is used for fabricating the conically shaped plug 20. A center axis hole in the plug 20 allows a center member or a core of the cable to be passed through the termination hardware without interfering with the strength of the termination.

Sleeve 22 is fabricated out of a malleable material such as annealled copper which is relatively soft and workable, or pliable, before the termination arrangement is put together. A metal, such as aluminum, having an internal lubricant is not useable. When the sleeve 22 is positioned to cover the plug 20, as shown in FIG. 1, at the base opening of the socket body 10 while the strands are flared out therein, the termination arrangement is ready for insertion into the socket.

Figure 2:
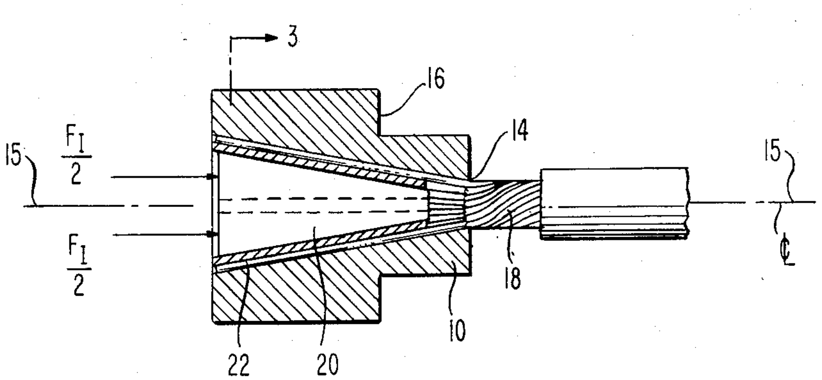
FIG. 2 is a fragmentary cross-sectional view of a cable termination arrangement in place on an end of a cable.

As shown in FIG. 2, this combination of the plug 20 and the sleeve 22 is pressed into the socket body 10 with an insertion force $F_I$ that is higher than the expected tensile force to be applied to the cable. Such expected tensile force may be near the maximum tensile force $F_M$ for the cable design.

By so pressing the plug 20 and sleeve 22 into the socket body, the cable strands are trapped between the wall of the socket body and the sleeve. Resulting compressive and shear forces cause the copper of the sleeve 22 to cold flow around the separate strands of the cable. The copper partially fills the gaps, or interstices, between the strands of the cable. As a result of the cold working of the copper, it is work-hardened to a higher shear strength that increases the strength of the resulting termination.

Figure 3:
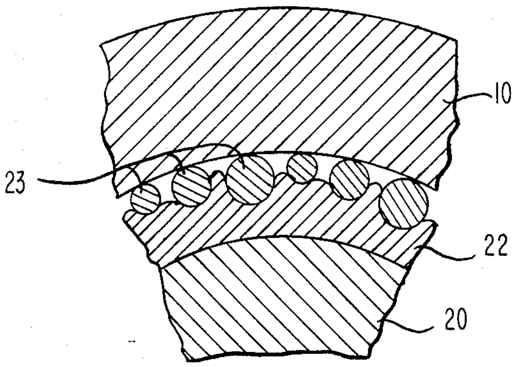
FIG. 3 is a partial cross-sectional end view of the cable termination shown in FIG. 2.

As shown in FIG. 3, the cold flow of the copper sleeve increases the contact between the surface of the copper sleeve 22 and the surfaces of the strands 23. Instead of a line contact with each strand 23, as occurred before the forced insertion step, there now is an area of contact between the sleeve 22 and each strand 23 of the cable. Friction forces along each of these areas increase the strength of the termination arrangement.

It is noted that the separate strands 23 may have the same diameter as one another or may have different diameters from one another. The strength in the resulting termination arrangement occurs regardless of whether the strand diameters are uniform or of various sizes.

Figure 4:
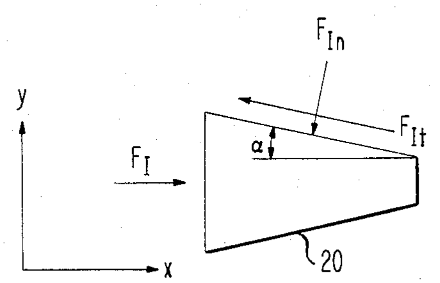
FIGS. 4, 5 and 6 are force diagrams relating to a cable termination arranged in accordance with the invention.

As shown in FIG. 4, the injection force $F_I$ is broken into two force components. One force component is the normal component $F_{In}$ which is perpendicular to the surface of the plug 20 and creates two friction forces. One of these friction forces is between the copper sleeve 22 and the strands 23 of FIG. 1. The other friction force is between the strands 23 and the socket 10. The other force component in FIG. 4 is the tangent component $F_{It}$ which is parallel to the surface of the plug 20. Balancing forces in the x-direction:

$$F_I = F_{In}\sin\alpha + F_{It}\cos\alpha. \tag{1}$$

Using known friction formulas, $$F_{It} = \mu F_{In}. \tag{2}$$

By substituting equation (2) into equation (1), $$F_I = F_{In}\sin\alpha + \mu F_{In}\cos\alpha = F_{In}(\sin\alpha + \mu\cos\alpha).$$

Then $$F_{In} = F_I/(\sin\alpha + \mu\cos\alpha). \tag{3}$$

For small values of $\alpha$, $\cos\alpha \approx 1$, $\sin\alpha << \cos\alpha$, and $$F_{In} \approx F_I/\mu. \tag{4}$$

Because $\mu < 1$, a small angle $\alpha$ produces a large injection normal component $F_{In}$.

Figure 5:
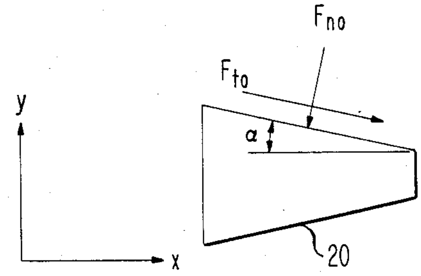

Referring now to FIG. 5, there is shown a force diagram with the injection force $F_I$ removed. Without the injection force, the normal force component $F_{no}$ is slighly decreased from the value of the force component $F_{In}$, but it remains significant due to energy stored in the system.

Then $$F_{no} \approx F_{In}, \text{ and} \tag{5}$$

the tangential component $F_{to}$ reverse direction and decreases in magnitude.

Balancing forces in the x-direction:

$$F_{no}\sin\alpha = F_{to}\cos\alpha, \text{ or } F_{to} = F_{no}\tan\alpha. \tag{6}$$

In the limit $$F_{to} = \mu F_{no}. \tag{7}$$

The required condition for the plug to stay in the socket body is $$F_{no}\sin\alpha \leqq F_{to}\cos\alpha. \tag{8}$$

Using equation (7) in equation (8), in the limit:

$$F_{no}\sin\alpha \leqq \mu F_{no}\cos\alpha, \text{ or } \sin\alpha \leqq \mu\cos\alpha. \tag{9}$$

Thus the acceptable range of values for the angle $\alpha$ is limited by an expression $$\tan\alpha \leqq \mu. \tag{10}$$

Figure 6:
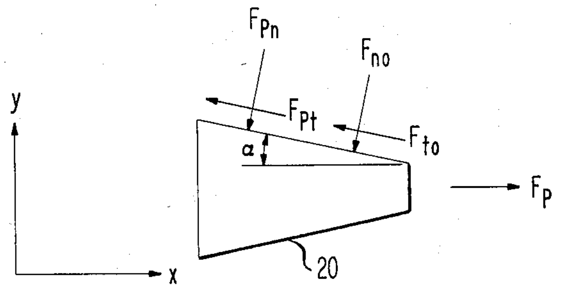

Referring now to FIG. 6, there is shown a force diagram with tension applied to the cable. The existing tangential force from the no external load condition opposes movement resulting from the tensile force. The cable is under tension and the strands are trying to pull out of the termination. As long as the tensile force $F_P$ is less than the friction force between the strands 23 and the socket 10 of FIG. 1 plus the friction force between the strands 23 and the plug-copper sleeve combination, the strands will not move. As the pulling force increases, the strands try to move out of the termination, but at this stage the strands 23 are pulling the plug 20 and sleeve 22 combination with them due to friction. The plug produces additional surface loads $F_{Pn}$ and $F_{Pt}$. The harder the strands 23 pull on the plug and sleeve combination, the higher $F_{Pn}$ becomes. Therefore, the friction force increases with cable tension and prevents the steel wires from pulling out. This system is thus self-energizing.

Balancing forces in the x-direction:

$$F_P = F_{no}\sin\alpha + F_{to}\cos\alpha + F_{Pn}\sin\alpha + F_{Pt}\cos\alpha. \tag{11}$$

The total normal force on the plug $= F_{no} + F_{Pn}$ and the total tangent force on the plug $= F_{to} + F_{Pt}$.

In the limit, $$F_{to} = \mu F_{no}, \text{ and} \tag{12}$$

$$F_{Pt} = \mu F_{Pn}. \tag{13}$$

Also in the limit, $$F_P = F_{no}\sin\alpha + \mu F_{no}\cos\alpha + F_{Pn}\sin\alpha + \mu F_{Pn}\cos\alpha,$$

$$\text{or } F_P = (F_{no} + F_{Pn})(\mu\cos\alpha + \sin\alpha). \tag{14}$$

For small angles, $F_P \approx \mu(F_{no} + F_{Pn})$.

Using equations (4) and (5), $$F_{no} \approx F_I/\mu, \text{ and} \tag{15}$$

$$F_P \approx F_I + \mu F_{Pn}. \tag{16}$$

Thus it is shown that the pulling force $F_P$, which will pull the strands 23 out of the socket 10, is greater than the injection force $F_I$.

Although the plug 20 and the sleeve 22 have been shown and described as having surfaces inclined at the angle $\alpha$ from the center axis, that is an exemplary angle for simplifying computations. Plugs and sleeves, having surfaces inclined at angles greater than the angle $\alpha$, also are useful in high strength cable terminations.

From the foregoing mathematical analysis, it is clear that for some purposes the termination arrangement is strong enough without the sleeve.

The foregoing describes some embodiments of the invention. Those embodiments together with others, which are obvious in view thereof, are considered to be within the scope of the invention.

What is claimed is:

1. A stranded cable termination arrangement comprising
   - a high strength socket having a frustum shaped interior tapering from a base opening to a top opening;
   - a group of high strength cable strands inserted into the top opening with individual strands spread out forming a single layer of strands at the base opening;
   - a malleable metallic sleeve shaped to fit inside of the socket; and
   - a high strength plug inserted into the sleeve and socket by a compressive force exceeding a maximum tensile force of the stranded cable for reforming the sleeve around the strands and holding the cable in the socket without slippage when a tensile force is applied between the cable and the termination arrangement.

2. A stranded cable termination arrangement, in accordance with claim 1, wherein the sleeve is fabricated out of annealled copper.

3. A stranded cable termination arrangement, in accordance with claim 1, wherein the group of strands is comprised of individual strands having different diameters from one another.

4. A stranded cable termination arrangement in accordance with claim 2, wherein the reforming plug work-hardens the sleeve for increasing shear strength of the sleeve; and zero slippage occurs between the cable and the socket when a tensile stress up to the maximum tensile load of the cable is applied between the cable and the socket.

5. A stranded cable termination arrangement comprising a high strength socket having a frustum snaped interior tapering from a base to a top opening;

a group of high strength cable strands inserted into the top opening with individual strands spread out forming a single layer of strands at the base opening; and a high strength plug inserted into the socket by a compressive force exceeding a maximum tensile force of the stranded cable for holding the cable in the socket without slippage when a tensile force is applied between the cable and the termination arrangement.

* * * * *